United States Patent [19]

Jordan

[11] 4,115,595

[45] Sep. 19, 1978

[54] PROCESS FOR COLORING MARASCHINO CHERRIES WITH NATURAL COLORS

[75] Inventor: J. Kirk Jordan, Lombard, Ill.

[73] Assignee: Beatrice Foods Co., Chicago, Ill.

[21] Appl. No.: 851,357

[22] Filed: Nov. 14, 1977

[51] Int. Cl.$^2$ .............................................. A23L 1/275
[52] U.S. Cl. ................................... 426/250; 426/102; 426/103; 426/540; 426/639
[58] Field of Search ............... 426/102, 103, 250, 540, 426/639

[56] References Cited

U.S. PATENT DOCUMENTS

| | | | |
|---|---|---|---|
| 2,692,831 | 10/1954 | Weckel et al. | 426/250 |
| 3,336,141 | 8/1967 | Frisina | 426/250 |
| 4,027,042 | 5/1977 | Von Elbe et al. | 426/540 |

OTHER PUBLICATIONS

Warner–Jenkinson Mfg. Co., "Coloring Cocktail Cherries", St. Louis, Mo., 1963.

*Primary Examiner*—Jeanette M. Hunter
*Attorney, Agent, or Firm*—Murray & Whisenhunt

[57] ABSTRACT

A process for dyeing foods with oxidation-sensitive natural colors such as betalaine or anthocyanin plant extracts, wherein the food is adjusted, if necessary, to an $SO_2$ content of a maximum of 30 ppm, and a pH value below 7.0, the food in enough water to cover the food is placed in a sealable container, substantially all air in the container is removed, and an oxidation-sensitive natural color is added to the container contents. The container is then sealed, while maintaining air exclusion therefrom, and stored, preferably under ambient conditions.

15 Claims, No Drawings

PROCESS FOR COLORING MARASCHINO CHERRIES WITH NATURAL COLORS

BACKGROUND OF THE INVENTION

The present invention is directed to the dyeing of foods, such as fruits and vegetables, with oxidation-sensitive water soluble, plant extract natural colors such as betalaine and anthocyanin pigments.

Maraschino cherries have been produced from sweet cherries for an extended period of time. Traditionally, the sweet cherries have been brined in an aqueous $SO_2$ media, with the $SO_2$ present in levels above 3,000 ppm. The high $SO_2$ levels in the cherries allow the cherries to be bacteriostatically stored for months or even years until further processing. Furthermore, while the cherries, when freshly harvested, are heterogeneously colored by their natural occurring anthocyanin pigments, the aqueous $SO_2$ brine bleaches the fruit to a homogeneous straw-yellow color, and in this condition, the fruit may then be colored by a natural or artificial color to a uniform color shade. In processing, the $SO_2$ levels are generally lowered to the range of 100-200 ppm by leaching the fruit in fresh water.

Prior art then cooked the cherries at relatively low temperatures for several days in a sugar solution, with the cooking heat improving the diffusion of the sugar into the cherry, while raising the soluble solids level of the solution by dessication of water. During this period of time, the sugar content of the cherry will pass from about 5 to 40% by weight.

During the sugaring process, the $SO_2$ level in the cherries is generally further reduced, to about 50 ppm or less. Final $SO_2$ levels of about 10 ppm are not unusual in the finished cherry.

To date, the prior art has normally added a synthetic color during the cooking period, or at least a portion thereof, and the synthetic color is subjected to the cooking temperatures, which are normally in the range of 140° F. to 180° F., for at least one day, in order to diffuse the color into the cherry. Thereafter the cherries are packed in glass containers with the desired syrup added thereto.

The naturally occurring anthocyanin pigment in cherries is oxidation-sensitive, and fades rapidly, imparting to the cherries a brownish appearance, when subjected to oxidation conditions after the cherries are picked. For this reason, it has normally been considered necessary to remove the natural cherry color and replace same with other colors imparting a bright red appearance to the cherries.

Other plant extract, natural colors, such as those derived from other fruits and vegetables, such as, for instance, betalaines from beets, or anthocyanins from grapes, strawberries, cranberries and the like are also generally very sensitive and unstable, with degradation caused by oxygen, heat, metal ions, enzymes and various other factors.

Processes for preparing maraschine cherries or a maraschino style cranberry are disclosed in U.S. Pat. Nos. 2,019,030 to Tucker, 2,494,258 to Nickol and 2,692,831 to Weckel. In the Weckel process of producing a maraschino style cranberry, a hypobaric processing step is used wherein a gas is evacuated from the cranberries without volumetric replacement of the gas by water or other fluid, in order to shrivel the berry skins to densify the cranberries relative to the water in which they are floating, causing them to sink. In this regard, it is clear that complete immersion of the cranberries facilitates a rapid diffusion of sugars and dyes into the berries in subsequent processing steps.

The Tucker process is directed to a secondary bleach step to remove any remaining blemishes from the surface of the cherries after a primary bleach ($SO_2$) treatment. The Tucker disclosure merely indicates that conventional coloring and syruping steps are utilized with the bleached cherries placed in suspension in a dilute sugar solution containing the proper amount of coloring matter, and presumably thereafter the cherries are subjected to conventional syruping or cooking temperatures. No specific coloring agent is disclosed in this patent.

The Nickol patent discloses a process wherein the syruping of the cherries is effected simultaneously with a removal of sulfur dioxide step. The patent indicates that after the syruping step is completed, additional flavor and color may be added to the syrup, the cooked cherries can be filled into bottles and covered with such syrup, and then pasteurized at 170° F. The Nickol patent does not indicate what coloring agents are utilized and there is no suggestion of maintaining the container contents at low temperatures after color addition, or of avoiding exposure to oxygen (air).

In 1976, the U.S. Food and Drug Administration banned the use of the artificial food coloring agent FD&C Red #4 in foods. Previously this coloring agent had been used to give maraschino cherries their distinctive red color.

The remaining synthetic colors available for coloring the maraschino cherries, FD&C Red #3 and Red #40 are less desirable. FD&C Red #3 is insoluble in water below pH 4, and is subject to color fading upon exposure to light, or upon exposure to $SO_2$. FD&C Red #40 becomes orange when exposed to $SO_2$, dulls and darkens upon exposure to light, and fades upon prolonged light exposure. Neither of these dyes adequately covers surface blemishes of dyed fruits. At the present time, FD&C Red #40 is under scrutiny by the FDA as a possible carcinogen, and is not permitted to be used in foods in Canada.

The publication "Food Technology", July, 1977 issue, at page 106, indicates that scientists at Michigan State University were seeking new ways to color maraschino cherries with natural colors. The investigator found that carotenoids were unstable and rapidly oxidized. Beet pigments were examined but reportedly did not work in the pH range which was normally found in cherries, and also had flavor and odor overtones. The anthocyanins were found to be the most promising candidate for a maraschino cherry color, being water soluble and rapidly diffusable into the cherry tissues. The anthocyanins investigated were those in cranberry juice, grape skins, elderberries and purple plums, and cherries were colored with "varying degrees of success".

Beets have previously been used to color pickled eggs, as disclosed in Women's Day Encyclopedia of Cookery, Third Edition, page 66, Fawcett (1966), wherein skinned small young beets are placed in a deep bowl in a solution which also contains hard cooked shelled eggs. The ingredients in the deep bowl are stored in a refrigerator for several days before serving.

It appears that the refrigeration is required because of the chemical instability in air of extracted beet pigments, which otherwise would be subjected to rapid oxidation to a clear or brown state. With adequate refrigeration, however, natural pigments can retain their color for extended periods of time in air.

SUMMARY OF THE INVENTION

Fruits and vegetables are dyed with water-soluble, oxidation-sensitive natural colors extracted from plants by adjusting the $SO_2$ content of the food, if necessary, to a maximum of 30 ppm, placing the food substantially under water in a sealable container, removing substantially all air in the sealable container, adding the oxidation-sensitive color to the container and thereafter sealing the container while continuing to exclude air therefrom. The food and color in the container are held at substantially ambient temperatures for at least a time sufficient to impart the desired color to the food.

The process is particularly applicable for the coloring of pitted maraschino cherries, with a natural color which is a betalaine or anthocyanin, wherein substantially all air is removed from the cavities of the cherries, and replaced by a corresponding volume of the aqueous solution covering the cherries, prior to the sealing of the container of cherries. Any air in the container head space should be replaced by a non-oxidizing gas, or removed by means of a vacuum.

The desired bright red color of maraschino berries is obtained, while using the naturally derived color which is preferred for aesthetic and marketing reasons, and as a practical option in the event FD&C Red #40 is delisted as a permitted food additive.

DETAILED DESCRIPTION OF THE INVENTION

The foods which can be dyed by the present invention include fruits such as apples, applesauces, cherries, cranberries, pineapples, and the like, and vegetables, such as potatoes, turnips, beans, corn and the like. The present invention is particularly applicable to the coloring of fruit, especially maraschino type cherries. The fruit may be first subjected to a conventional bleaching step, by being placed in an $SO_2$ brine having an $SO_2$ content of at least about 3,000 ppm. The brining step is generally followed by an aqueous leaching step, wherein the $SO_2$ content of the bleached fruit or vegetable is reduced to the order of 100-200 ppm of $SO_2$. Thereafter, the fruit is sugared, by cooking in an aqueous sugar solution until the sugar content has reached at least 30% by weight, and preferably about 40% by weight. Normally, the sugar content will not exceed about 50% by weight, although this will vary with the particular fruit in question.

The sugaring step is generally conducted at conventional cooking temperatures of about 140° F. to 180° F., for several days until the desired sugar level in the fruit has been achieved.

The bleaching and sugaring steps are conventional, except no colors are added during the sugaring (cooking) step. In the prior art practice, the coloring of fruits with heat stable synthetic dyes has traditionally been accomplished during the sugaring step, with the dyes subjected to the relatively high temperature of that step. In contrast, the present invention delays the coloring step to as late a stage as possible in order to minimize exposure of the natural plant extract color to heat and air.

After the sugaring step is completed, the $SO_2$ content of the fruit is adjusted, if necessary, to a maximum of 30 ppm, and preferably the $SO_2$ content is less than 20 ppm. If greater amounts of $SO_2$ are retained within the food, the process of the present invention will not perform satisfactorily as the color stability of the naturally derived colors will decrease in the course of normal shelf life. Normally the fruit will have an $SO_2$ content of at least 5 ppm, but this is not critical and the $SO_2$ content of the fruit can even be zero, if desired.

The $SO_2$ content of the fruit may be reduced by heating the fruit, and such heating step must be conducted prior to the addition of the natural colors.

After the optional $SO_2$ content adjustment, the fruit or vegetable is placed into the containers in which it is to be sold, and water or a suitable aqueous syrup solution is added thereto. Such syrup solutions are conventional, and well known to those in the art, and may contain, for instance, 20 to 50% by weight of corn syrup solids, sucrose or other sugar. In the case of coloring maraschino-type cherries according to the process of the present invention, the cover syrup is preferably an aqueous solution of 30 to 50% by weight corn syrup solids, sucrose or other sugar. Normally, the syrup solution, which is otherwise conventional, contains the natural colors. After the syrup solution is added to the food, a vacuum is applied to the container contents, in an essential step which eliminates air bubbles entrapped in, e.g., pit cavities, and adhering to the outer skin of the fruit or vegetable. If the air is not eliminated, the oxygen therein will cause color degradation of the naturally derived colors, such as to result in a brownish overcast of the color. In the vacuum step, air removed from the food must be replaced with a corresponding volume of the syrup solution, as otherwise, the food will tend to shrink and wrinkle and will have an unattractive appearance.

The natural plant extract colors can be added directly to the container contents; or the syrup solution which is added to the food, such as cherries, in the container, can have the plant extract natural color incorporated into such syrup solution prior to the addition to the container. In the latter case, however, the cover syrup containing the plant extract natural color should be blanketed by a non-oxidizing gas to prevent air oxidation of the dye, especially if the cover syrup is held for more than several hours without refrigeration prior to the container being filled and sealed.

Any oxidation-sensitive, water-soluble plant extract natural color may be used in the process of the present invention. The color may be extracted from the same type of food as is to be colored according to the process of the present invention, or the coloring may be extracted from a quite distinctly different type of food. Preferably, the natural color is a betalaine color, and in the preferred embodiment of the process of the present invention, pitted maraschino cherries are dyed using betalaine colors derived from beets.

Suitable betalaine natural colors are disclosed, for instance, by Adams et al., Production of a Betacyanine etc., Journal of Food Science, Volume 41, page 78 (1976). A particularly suitable betalaine natural color is that sold by BEATRICE FOODS COMPANY under the trademark COLORTREME. The plant extract natural colors may be derived from beets, which is preferred, or grapes strawberries, cranberries, elderberries, purple plums, and the like.

The preferred embodiment of the present invention wherein maraschino-type cherries are colored with a betalaine natural pigment preferably utilizes 0.2 to 2.4 weight % of betacyanin based on the weight of the container contents. The range is based on the utilization of approximately equal amounts of the cherries and the cover syrup solution, and any significant change made in the ratio will vary the amount of betacyanin pigment used. Betacyanin, the most significant coloring agent in betalaine natural colors derived from beets, is readily determined in amount by the Nilsson analysis described hereinafter. If amounts of betacyanin below the above range are utilized, generally the cherries will be colored too light to be commerically acceptable. On the other hand, if the amount of betacyanin used exceeds the range, a purplish colored cherry will result, which is again commercially undesirable.

If anthocyanin pigments are utilized, modifications of the above range to reflect the relative tinctorial strength of the pigment must be made. Furthermore, the various anthocyanin pigments vary widely depending on the source thereof, as respects tinting power or tinctorial ability, as known in the art.

At the point of color addition, the pH of the food and syrup solution in the container should be less than 6.0, preferably 4.0 to 3.0. Data to date indicates that the pH may be as low as 2.5. The pH is reduced, if necessary, by adding natural organic acids, such as citric acid. These natural organic acids are generally not used to produce a pH below about 2.5 in most foods, so the pH value of the food will be in the range of 2.5 to 6.0 at the time of color addition.

Air is removed from the container head space by the use of suitable inert (non-oxidizing) gases, such as steam, nitrogen, or the like, and then the container is sealed.

It is possible to dye the cherries with the naturally derived colors in a separate step, after the sugaring step, or alternatively, as the later part of the sugaring step, if heat is avoided at the point of the addition of the naturally derived colors. In any event, prolonged exposure of the fruit and cover syrup solution containing the plant extract natural color to air (oxygen) should be avoided, although such exposure may be permissible if the container contents are chilled, such as by the use of refrigeration, to such an extent that air oxidation of the plant extract natural color is no longer a significant problem. The temperatures of the naturally derived colors should not exceed 100° F. for any prolonged period, and preferably do not exceed 85° F.

The cherries can alternatively be drained, while being maintained in an inert atmosphere, and packaged into the appropriate containers, with the packaging syrup being added thereto. In this instance, wherein an inert gas would be present in the cherry pit cavities, it would be unnecessary to utilize a vacuum step mentioned above. However, the maintenance of the inert gas atmosphere is relatively cumbersome, and does not readily lend itself to commercial food processing operation. Thus, this embodiment is decidedly not preferred.

While the vacuum which is used to eliminate the air from the cavities of the cherries can vary widely, the vacuum will normally be of at least 22 mm of mercury, and preferably at least about 25 mm of mercury. For practical reasons the vacuum will generally not exceed about 28 inches of mercury, and normally will not exceed about 25 inches of mercury.

The dyed fruits and vegetables produced according to the process of the present invention exhibit good color shelf stability when stored under ambient conditions. The shelf stability can be extended, and generally approximately doubled, if an antioxidant is utilized in the container contents. Ascorbic acid, suitably used at a level of 0.1% by weight, is a most acceptable antioxidant, although other antioxidants known to the art as suitable for food applications may be utilized. It appears that the antioxidant scavenges any remaining oxygen in the container contents, thereby extending the shelf life of the product.

The present invention allows bright colors of the foods to be obtained while using naturally derived colors, and this results from the fact that the naturally derived colors are subjected to reduced color degradation. For the same reason, less of the naturally derived colors may be used to produce a given depth of shade, as compared to other processes of using naturally derived colors.

The invention will be understood more readily from the following example, wherein all percents and parts are by weight unless otherwise indicated cl EXAMPLE 1

A 5 gallon pail of pitted, sweet cherries preserved in a traditional calcium bisulfite brine was purchased from a commercial briner. The fruit, which had a $SO_2$ content of 3,100 ppm, was drained of brine and immersed in flowing fresh water for a number of hours until an iodine titration analysis of a representative sample of drained, pureed cherries showed reduction in the $SO_2$ concentration to approximately 300 ppm. The drained fruit was transferred to a heating vessel and immersed in an aqueous syrup containing 10% by weight corn syrup solids and sufficient citric acid to lower th pH of the vessel contents to 3.5. The drained fruit and the aqueous syrup were used in a 1:1 weight ratio. The mixture was heated to approximately 160° F. (70° C.) and held at that temperature for several days. As the water evaporated it was volumetrically replaced by a viscous syrup containing 80% by weight corn syrup solids. After several days of slow cooking evaporation and addition of corn syrup solids, the soluble solids content of the heated syrup in the vat rose gradually to 40% by weight. Simultaneously, due to the heat and evaporation the $SO_2$ concentration was lowered to 25 ppm. The cherries were drained, and 3 oz. of fruit was filled into 6 oz. glass jars. To the remaining 40% solids syrup was added flavorings (the flavoring agent was a mixture of equal parts of benzaldehyde and glycerine, with the blend used in the amount of 0.1% by weight), 0.2% sodium benzoate (a preservative) and 0.2% ascorbic acid (an antioxidant). Then 2.9 ozs. of syrup was added to the cherries in jars such that the fruit was covered with syrup. Next the jars were subjected to a hypobaric pressure of −25 inches Hg for 10 seconds to evacuate the air bubbles adhering to the cherries or trapped in the pit cavities. Then 0.1 oz. of COLORTREME (Beatrice Foods Company) beet juice concentrate was added on top of the cover syrup and cherries. The COLORTREME beet juice concentrate contained 300 mg % (0.3% by weight) of betacyanin as determined by the analysis described in T. Nilsson, Lantburkshögkolans Annaler, "Studies Into The Pigments in Beetroot", pp. 212–214 (1970). Finally before sealing the jar, the headspace was flushed with nitrogen gas to eliminate air in the head-space. The jars were sealed and stored at room temperature for 7 days, during which time the dye diffused to equilibrium throughout the jar contents, dyeing both the cherries and the cover syrup to a dark red color. After 6 months storage at room temperature, the cherries packaged in glass jars retained an attractive bright red color.

EXAMPLE 2

Approximately 8 lbs, (3.6 kg) of fresh cucumbers obtained from the market were washed and thin sliced as for a salad. Approximately 120 g of slices were placed in each of 30 eight ounce jars. Approximately 120 ml of room temperature, freshly made pickling brine dyed red with beet juice was poured over the room temperature cucumbers in the jars so that the slices were covered with liquid. Immediately thereafter the jars were subjected to a hypobaric pressure of −25 inches Hg for 6 seconds to evacuate air bubbles adhering to the cucumber slices. Finally just before sealing the jars, the headspace was flushed with nitrogen to eliminate headspace air. The sealed jars were stored at room temperature for 3 days during which the brine diffused to equilibrium throughout the jar, dying the pickled cucumbers and the brine an intense red color. After 6 months storage at room temperature, the pickled cucumbers retained an attractive red color.

A gallon of the pickling brine was made by the following recipe:

115 g — salt
115 g — sugar
825 ml — white vinegar (50 grain)
5 ml — lactic acid (85-90%), Monsanto Co.)
0.4 ml — oil of dillweed (Kalsec, Inc.)
0.1 ml — polysorbate 80 (Mazer Chemicals, Inc.)
4.2 ml — 1% (volumetric) garlic concentrate (Kalsec, Inc.)
3.8 g — ascorbic acid (Pfizer, Inc.)
3.8 g — sodium benzoate (Mallinckrodt, Inc.)
3.8 g — potassium sorbate (Pfizer, Inc.)
53 ml — COLORTREME beet juice concentrate (Beatrice Foods Co.)

Pour the salt, sugar, ascorbic acid, benzoate and sorbate into 2 liters of water and stir until dissolved. With stiring slowly add the vinegar and lactic acid. In a small container mix the oil of dillweed and polysorbate 80, then dilute with several milliliters of water, and add to the brine. Add the 1% (volumetric) solution of garlic concentrate and the COLORTREME. Add sufficient water to raise the final brine volume to 1 gallon.

What is claimed is:

1. Process for dyeing fruit or vegetable food with oxidation-sensitive, water soluble plant extract natural colors, said process comprising:
   adjusting the $SO_2$ content of the food, if necessary, to a maximum of 30 ppm;
   adjusting the pH of the food, if necessary, to a value below 7.0;
   placing the food and water in a sealable container, wherein the amount of water is at least that amount required to substantially cover said food;
   removing substantially all air in said sealable container;
   adding a coloring amount of an oxidation-sensitive water soluble plant extract natural color to said water;
   thereafter sealing said sealable container while excluding air therefrom; and
   permitting said food to be exposed to said natural color in said container at a temperature below 100° F. at least for a time sufficient to dye the food the desired color.

2. Process of claim 1, wherein the container contents are at a pH of less than 6.

3. Process of claim 1, wherein said food is fruit.

4. Process of claim 3, wherein said fruit is cherries.

5. Process of claim 4, wherein said natural color is betalaine.

6. Process of claim 5, wherein said betalaine is derived from beets.

7. Process of claim 6, wherein said container is the container in which said food will be sold to ultimate consumers.

8. Process for coloring pitted maraschino-type cherries with a natural plant extract betalaine color, said process comprising:
   adjusting, if necessary, the $SO_2$ content of bleached sugared cherries to a maximum of 30 ppm;
   adjusting, if necessary, the pH value of the cherries to a value less than 7.0;
   placing the cherries in a sealable container in at least sufficient aqueous syrup solution containing about 30 to 50% solids to substantially cover same;
   removing substantially all air from the pit cavities of said cherries;
   adding a coloring amount of a natural plant extract betalaine color to the container contents;
   replacing any air in the container head space with a non-oxidizing gas or vacuum;
   thereafter sealing said sealable container while excluding air therefrom; and
   permitting said food to be exposed to said natural color in said container at a temperature of less than about 100° F. for at least a time sufficient to color the food the desired color.

9. Process of claim 8, wherein said container is the container in which said cherries will be sold to the ultimate consumer.

10. Process of claim 9, wherein the cherries are colored with said natural colors at substantially ambient temperatures.

11. Process of claim 10, wherein said natural color is betalaine.

12. Process of claim 11, wherein said betalaine is derived from beets.

13. Process of claim 12, wherein the cherries have a sugar content of at least 30% by weight.

14. Process of claim 13, wherein the air is removed from the pit cavities of the cherries by subjecting the container contents, including said cherries, to a vacuum.

15. Process of claim 8, wherein said betalaine contains betacyanin in an amount of about 0.2 to 2.4 weight % based on the weight of said container contents.

* * * * *